Jan. 6, 1970  P. PENSA  3,487,887
CLOSURE FOR VEHICLE COMPARTMENTS
Filed Sept. 20, 1967  2 Sheets-Sheet 1

Inventor
PIETRO PENSA
BY Tweedale & Gerhardt
Attorneys

United States Patent Office
3,487,887
Patented Jan. 6, 1970

3,487,887
CLOSURE FOR VEHICLE COMPARTMENTS
Pietro Pensa, Milan, Italy, assignor to Massey-Ferguson Services N.V., Curacao, Netherlands Antilles
Filed Sept. 20, 1967, Ser. No. 669,034
Claims priority, application Italy, Oct. 8, 1966, 28,690/66
Int. Cl. B62d 25/10
U.S. Cl. 180—69                                 4 Claims

ABSTRACT OF THE DISCLOSURE

A vehicle engine compartment is closable by a hood having a pair of spaced rollers mounted at each side for sliding engagement with a guide channel mounted on the compartment sides. In the closed position, the rollers enter detent notches in the channels to engage a hood flange with the channel to frictionally hold the hood against sliding. The hood is slid partially open until the end rollers engage stops, whereupon the hood is pivoted fully open on those rollers, with the other rollers moving through channel apertures for disengagement.

---

The present invention relates to closures for vehicle compartments and especially to hoods for providing access to the engine compartments of motor vehicles.

According to the present invention a vehicle compartment closure comprises a cover portion, sliding means permitting the cover portion to partially expose said compartment, and pivot means then permitting said cover portion to be pivoted to further expose said compartment.

Preferably the pivot means is located adjacent the center of gravity of the cover portion when the latter requires to be pivoted.

Preferably the pivot means also constitutes part of the sliding means.

Preferably the sliding means is constituted by a roller and track assembly at least one roller being disposed adjacent to the center of gravity of the cover portion and partly constituting said pivot means.

An embodiment of the invention will now be described, by way of example, with reference to the accompanying drawing, in which.

Figure 1:
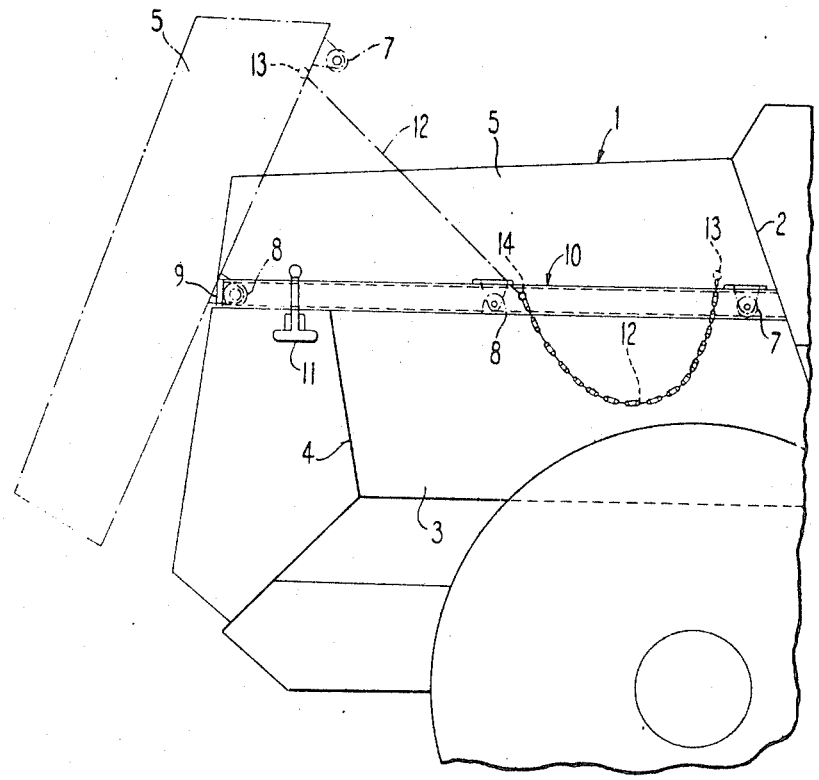
FIG. 1 is a partial elevation of a vehicle.

Referring to the drawings, a vehicle 1 having an engine at the rear has an engine compartment defined by a front wall, side walls and a rear wall indicated generally at 2, 3 and 4, respectively. A cover portion or hood 5 for this compartment is supported on a pair of tracks 6 fixed on the side walls 3, the tracks being of channel section and being disposed with the mouths of the channels facing one another.

The lower side wall 22 of each channel extends beyond the other side of the base 23 of the channel and merges into a depending flange 16 which is offset outwardly of and is parallel to said base 23. The tracks are fixed to the side walls 3 by means of the flanges 16.

Figure 2:
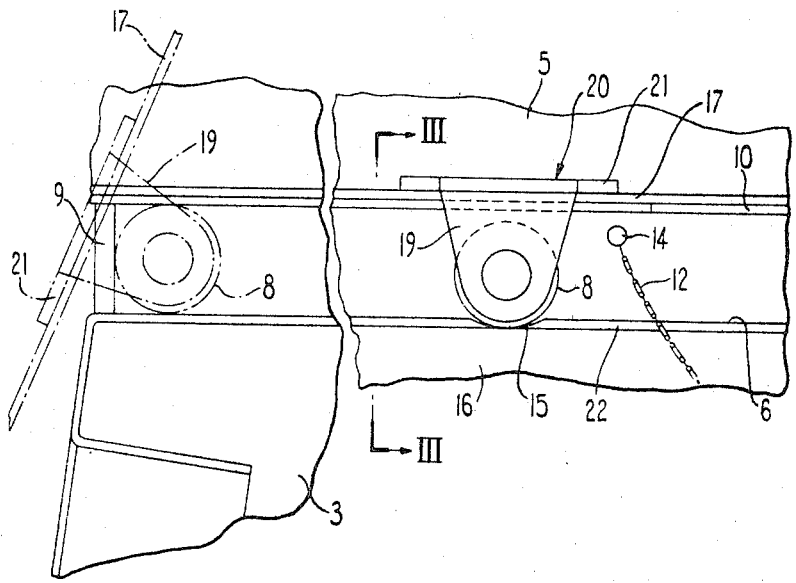
FIG. 2 is an enlarged detail of the sliding and pivoting means as viewed in the direction of arrow II in FIG. 3.
Figure 3:
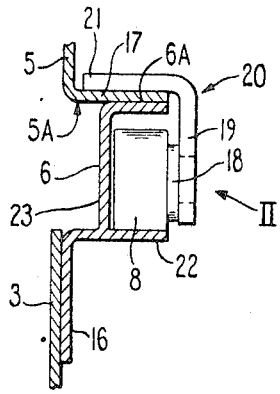
FIG. 3 is an enlarged section on the line III—III in FIG. 2.

Each side wall of the hood 5 has an inturned flange 17 whose outer surface 5A rests on the outer surface 6A of the upper side wall of the pertaining channel rail 6 when the hood 5 is in the closed position (FIG. 3). A front pair of rollers 7 are fixed to the side walls of the hood near the front of the latter and a rear pair of rollers 8 are likewise fixed to the side walls of the hood near the center of gravity of the latter. Each of the rollers 7 and 8 is mounted for free rotation on a stub axle 18 secured to the vertical flange 19 of a bracket 20 of angle section whose horizontal flange 21 is secured to the inner surface of the pertaining flange 17. A stop 9 is provided at the rearmost end of each of tracks 6 and a slot 10 is cut out of the top of each track at a point distant from the stop 9 by an amount equal to the spacing of the rollers 7 and 8. The lower side wall 22 of each channel rail 6 has two shaped openings 15 formed therein (only one seen in FIG. 2) in which the pertaining rollers 7 and 8 are received when the hood 5 is in its closed position, this having the effect of causing the surfaces 5A then to bear gravitationally on the surface 6A. Fasteners 11 are provided for detachably securing the hood to the side walls 3 in the closed position of the hood. A pair of tie wires or stays 12 is provided for securing the hood in its open position, each wire 12 being anchored at one end to the underside of the hood at the point 13, and at the other end to the appropriate track at the point 14.

The operation of the hood to fully expose the engine compartment for access is as follows. Starting from the full line position of the hood, the fasteners 11 are detached and the hood is slid backwards to a point where the rollers 8 abut the stops 9, the initial impetus of the sliding action freeing the rollers 7 and 8 from the openings 15. When the rollers 8 abut the stops 9, the rollers 7 are opposite the slots 10 and anti-clockwise pivoting of the hood is permitted by passage of the rollers 7 through the slots. When the hood reaches the position shown in the dot-dash outline, the wires or stays 12 are taut. Reversal of the above described movement causes the hood to close the engine compartment.

An advantage of the embodiment described is that the person seeking access to the engine compartment can reach the fasteners 11 and can slide the hood back to the pivoting position with ease while standing on the ground to the rear of the machine. When the pivoting position of the hood is reached, there is very little vertical movement of the center of gravity so it is easy to rotate the hood to fully expose the engine compartment.

A second advantage is that there are no removable panels to be lifted off and laid aside. On heavy construction vehicles the protective panels and hood require to be of robust construction to protect the engine from falling stones and tend to be heavy. The present invention avoids the necessity for completely removing the hood, yet provides full access to the engine compartment.

While a specific embodiment of the invention has been illustrated and described, the invention is not limited to the exact construction shown. Various alterations and modifications in the construction and arrangement of parts can be made without departing from the scope and spirit of the invention.

I claim:

1. In a vehicle having an engine compartment structure, and a hood structure for closing the compartment structure, means for connecting the hood structure to the vehicle for movement between positions fully closing and fully opening the compartment structure, comprising: a track member mounted on each side of the one structure, spaced rollers mounted on each side of the other structure for sliding engagement with a track member to slide the hood structure relative to the compartment structure from fully closed to partially open position; a stop on each side of the one structure each engageable by one of the rollers in partially open position for pivoting the hood structure relative to the compartment structure from partially open to fully open positions, the track members each including an aperture permitting disengagement of the other rollers therewith in partially open position to enable the said pivoting of the hood structure to fully open position, a retaining member on each of the structures, and disabling means for operatively disengaging the rollers from the track members in the fully closed position and mutually engaging the retaining members to restrain sliding movement of the hood structure.

2. The combination of claim 1, further including a flexible tie wire connected between the hood and compartment structures for limiting the pivotal movement of the hood from the partially open to fully open position.

3. The combination of claim 1, wherein the disabling means include detent notches in the track members for receiving the rollers in fully closed position, and the retaining members are mating surfaces mounted on both of the structures, the mating surfaces frictionally interengaging upon retention of the rollers in the detent notches to restrain sliding movement of the hood structure.

4. The combination of claim 3, wherein the rollers are mounted on the hood structure, the track members each comprise channels mounted on the compartment structure, with the mouths of the channels facing one another, and the apertures are formed in the upper walls of the channels for the passage of the other rollers into and out of engagement with their associated channel members.

References Cited

UNITED STATES PATENTS

| | | |
|---|---|---|
| 967,609 | 8/1910 | Campbell. |
| 2,338,477 | 1/1944 | Wolters et al. _____ 220—38 |
| 3,157,240 | 11/1964 | Chew _____ 180—69 |

FOREIGN PATENTS

| | | |
|---|---|---|
| 684,973 | 4/1964 | Canada. |
| 1,220,066 | 1/1960 | France. |
| 622,046 | 4/1949 | Great Britain. |

BENJAMIN HERSH, Primary Examiner

M. L. SMITH, Assistant Examiner

U.S. Cl. X.R.

16—179, 1281; 217—59; 220—38; 296—76